(No Model.)
E. WRIGHT.
ROTATING JOINT MECHANISM FOR STEAM APPARATUS.
No. 298,049. Patented May 6, 1884.
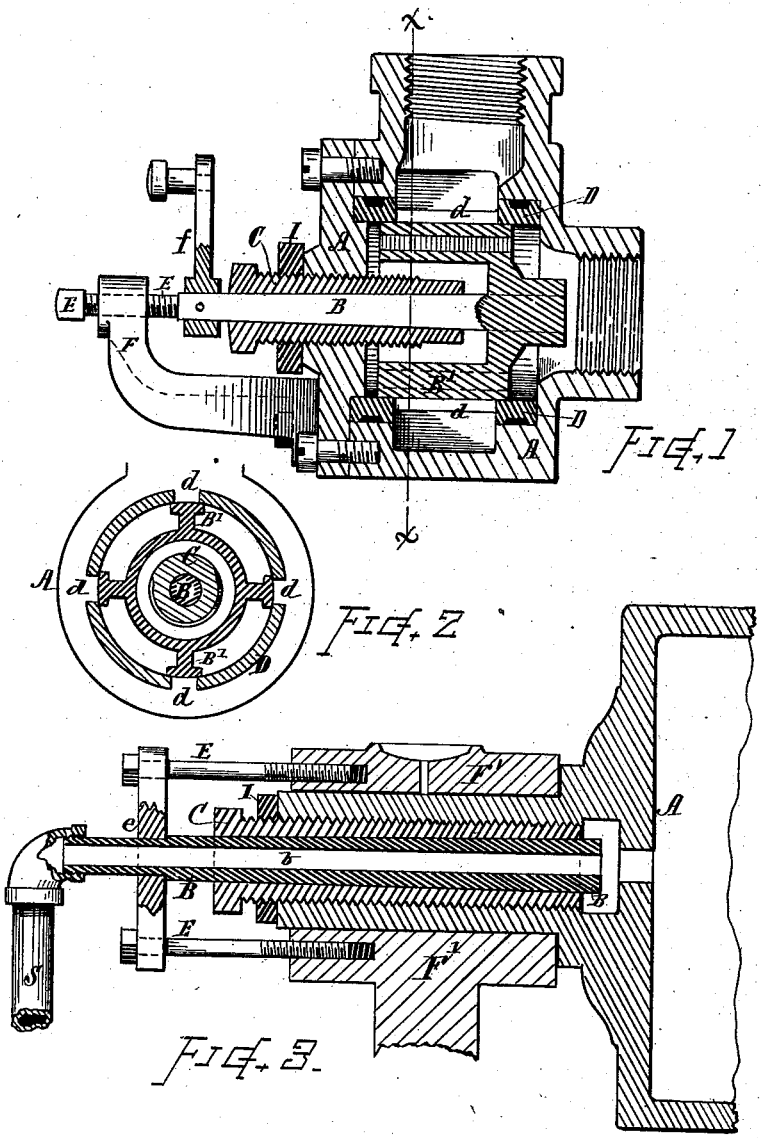
WITNESSES  
S. R. Barton  
Charles S. Bacon
INVENTOR  
Edward Wright  
By Chas. H. Burleigh  
Atty.

UNITED STATES PATENT OFFICE.

EDWARD WRIGHT, OF WORCESTER, MASSACHUSETTS, ASSIGNOR TO THE WRIGHT MACHINE COMPANY, OF SAME PLACE.

ROTATING JOINT MECHANISM FOR STEAM APPARATUS.

SPECIFICATION forming part of Letters Patent No. 298,049, dated May 6, 1884.

Application filed December 28, 1883. (No model.)

*To all whom it may concern:*

Be it known that I, EDWARD WRIGHT, a citizen of the United States, residing at Worcester, in the county of Worcester and State of Massachusetts, have invented certain new and useful Improvements in the Construction of Rotating Joint Mechanism for Steam Apparatus and other Purposes; and I declare the following to be a description of my said invention, sufficiently full, clear, and exact to enable others skilled in the art to which it appertains to make and use the same, reference being had to the accompanying drawings, which form a part of this specification.
The object of my present invention is to provide a method of constructing joints or bearings between stationary and rotating parts in steam apparatus, whereby said joints are rendered steam-tight without the necessity of stuffing-boxes or packings, while the bearing-surfaces are left free and easy for action.

To this end my invention consists in the method of construction and the joint mechanism, as herein shown and described, and comprising a long tapered stem fitted within a correspondingly-tapered sleeve or tubular bushing, said stem being exposed to steam-pressure acting on its larger end in direction to close the taper surfaces upon each other, and counteracted or sustained by a screw or adjustable bearer acting against its opposite end in the manner hereinafter explained, the particular subject-matter claimed being hereinafter definitely specified.
In the drawings, Figure 1 is a sectional view illustrating my invention as applied to a governor-valve or rotating steam-valve wherein the sleeve or outside parts are stationary and the stem is rotative. Fig. 2 is a transverse section of the valve, stem, and sleeve at line *x x*, Fig. 1; and Fig. 3 is a sectional view illustrating my invention as adapted to the connection of a steam-pipe with a revolving cylinder-journal wherein the sleeve or outer parts are rotative and the stem is stationary.

In referring to parts, A designates the body, cylinder, or shell within which the steam is confined, and B denotes the stem or part which passes through the inclosing metal, or makes connection from the exterior to the interior of the apparatus. In the apparatus illustrated in Fig. 1 these parts are the body, shell, and valve-stem of a governor-valve adapted for steam-engine governors of the kind described in my Letters Patent No. 245,688, wherein the valve B' is arranged for opening and closing ports *d* in the valve-seat D by partial rotation of said valve B', effected by means of a gear or arm, *f*, fixed on the outer end of the stem B and suitably connected with the governor-balls, which latter it is not necessary to herein show and describe.

C indicates a sleeve or tubular bushing, which forms a seat for the tapered stem B. Said sleeve is screw-threaded upon its exterior and fitted into a corresponding opening in the part A, where it can be adjusted in and out, if desired. The stem B and the interior of the sleeve C are made to match each other with a long slight taper, the diameter of the stem varying about one sixty-fourth of an inch (more or less) for each inch of length, such matching-surfaces being some one and three-fourths inch or more in length on the tapered part, as shown, so as to give a long uniformly close bearing of regular conical taper of very slight inclination, the inner end being the largest in diameter. The steam-pressure on the valve B' is self-balanced, except upon a surface equal to the sectional area of the stem B, so that the steam exerts a strain in direction of the axis, tending to force the stem B outward or to wedge the taper within the sleeve C. An adjustable step, bearing-piece, or screw, E, is arranged at the outer end of the stem B for adjusting and sustaining said stem against the steam-pressure in the manner indicated, said bearer being screw-threaded to an arm, F, or otherwise arranged in connection with a suitable support that is rigid or stationary in its relation to the body or cylinder A, so that by movement of the bearing-step or screw E the stem B can be adjusted within the sleeve C in a direction longitudinal of its axis and against the steam-pressure action, and the relation of the adjacent tapered surfaces can be so regulated as to give a smooth-running steam-tight joint between the stationary and rotative parts, which will operate with scarcely any friction, while preventing the escape of steam between the stem and its surrounding sleeve. A check-nut, I, is provided upon the screw-threaded sleeve C for retaining said sleeve at its position of adjustment. The tapered seat for the stem B may in some cases be formed in the solid metal of the part A, instead of interposing the screw-threaded sleeve C. I prefer, however, to employ said removable sleeve, as it facilitates the manufacture and is convenient for making any desired adjustments.

In Fig. 3 the stem B is made hollow for the passage of steam through it, as at $b$, and a pipe, S, is coupled to its outer end for supplying steam to a revolving cylinder, A. The sleeve C is screwed into the journal of the cylinder, which is mounted in bearings F'. The adjustment of the stem is effected by a collar, $e$, and two screws, E, in lieu of a single screw, as in Fig. 1. In this instance the cylinder A and seat-sleeve C are revoluble and the hollow stem B remains stationary.

With the stem B tapered, as specified, and the screw E having eighteen (18) threads to the inch, a quarter-turn of said screw will produce a variation of less than $\frac{1}{1000}$ of an inch between the surfaces. Hence it will be seen that a very nice adjustment can be maintained and the parts can readily be adjusted so as to prevent the escape of steam or other fluid and at the same time so as to avoid wearing-friction.

A cam, wedge, or lever might be in some cases employed, in lieu of the screw E, for sustaining and adjusting the stem against the steam-pressure; but I consider a screw-step the simplest and best for most instances.

What I claim as of my invention, and desire to secure by Letters Patent, is—

1. A rotating joint for apparatus working steam or other fluids under pressure, consisting of a long slightly-tapered stem fitted within a correspondingly-tapered seat or sleeve in a manner to be longitudinally acted upon by the fluid-pressure for closing the tapered surfaces upon each other, and means for sustaining and adjusting said stem in a direction opposite to the action of the steam-pressure in the manner set forth.

2. A rotative joint mechanism for preventing the escape of steam, or for similar purpose, in which the stem or inner joining part is exposed to the steam-pressure in a direction tending to close the joint or force the adjacent moving surfaces together, and with a positive adjustable bearer adapted for counteracting or sustaining said part in opposition to the steam-pressure and regulating the position of the joint-surfaces in relation to each other, as hereinbefore set forth.

3. A rotating or movable joint on parts communicating from the exterior to the interior of steam apparatus, composed of a slightly-tapered stem, an internally-tapered sleeve or seat bushing surrounding said stem and adjustably secured to the body, shell, or steam-cylinder, and means for sustaining and adjusting said stem within said sleeve to prevent the tapered surfaces being forced together firmly by action of the steam-pressure, substantially as herein set forth.

4. The combination, with the body, shell, or cylinder A surrounding the steam-space or pressure-chamber, of the stem or inner joint part, B, externally tapered in the manner shown and described, the seat-sleeve or outer joint part, C, fitting around said stem with a corresponding internal taper, and the screw or step E, mounted in an arm, F, or relatively fixed support and adapted for sustaining and adjusting said stem in opposition to the pressure from within said steam-chamber, as hereinbefore set forth.

5. The combination of the valve B', having the stem B tapered, as shown, the internally-tapered screw-threaded sleeve C, embracing said stem, the shell or case A, with an arm, F, the screw E, serving as a step for said stem, and an operating connection, $f$, for imparting rotative action to said stem, substantially as described.

Witness my hand this 22d day of December, A. D. 1883.

EDWARD WRIGHT.

Witnesses:
CHAS. H. BURLEIGH,
S. R. BARTON.